Feb. 20, 1951  G. A. TINNERMAN  2,542,883
FASTENING DEVICE
Filed Aug. 12, 1948  2 Sheets-Sheet 1
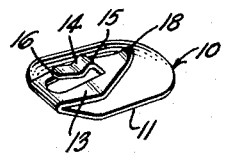
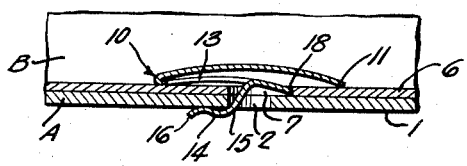
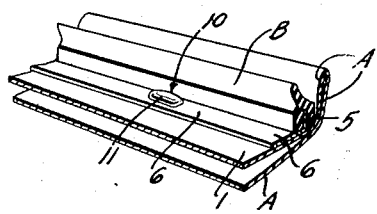
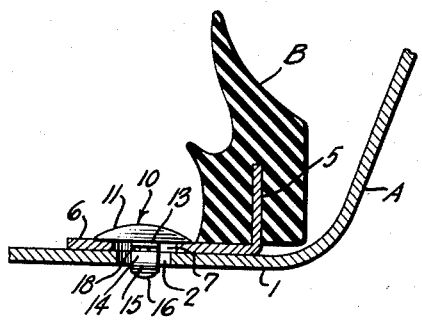
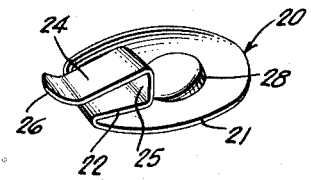
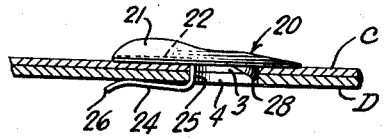
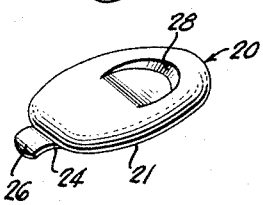
Inventor
GEORGE A. TINNERMAN
By
H. G. Lombard
ATTORNEY

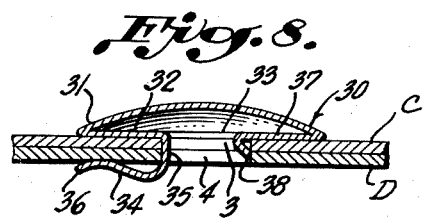
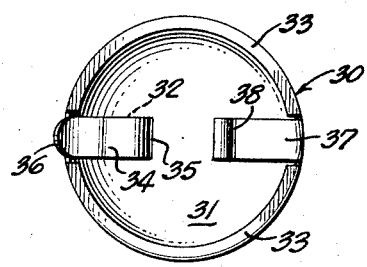
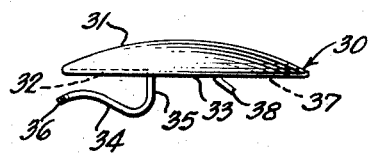
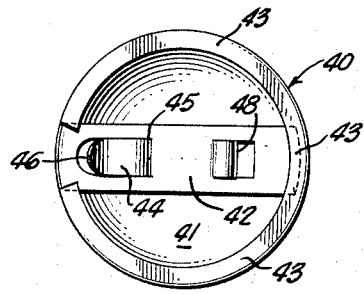
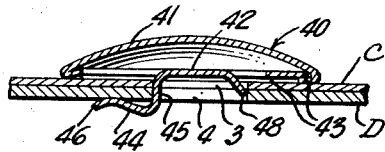
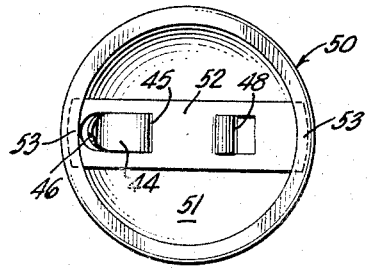
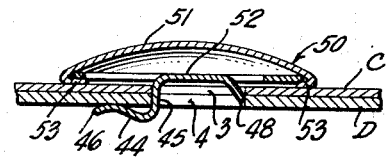
Inventor
GEORGE A. TINNERMAN
By
H. G. Lombard
ATTORNEY Patented Feb. 20, 1951

2,542,883

UNITED STATES PATENT OFFICE 2,542,883

FASTENING DEVICE

George A. Tinnerman, Cleveland, Ohio, assignor to Tinnerman Products, Inc., Cleveland, Ohio, a corporation of Ohio Application August 12, 1948, Serial No. 43,811

2 Claims. (Cl. 24—259)

This invention relates in general to fastening devices and deals, more particularly, with fastening devices in the form of clips or the like which are adapted to be attached in aligned openings in two or more parts to secure the same together.

Frequently the attaching opening for a clip or similar fastener is exposed on the outer side of the installation and there is, therefore, a tendency for water, dust and other foreign matter to pass through the attaching opening into the interior of the assembly. In automobile installations, for example, this is highly objectionable inasmuch as the entrance of such water, dust and other foreign matter into the interior of the vehicle body results in damage to the upholstery, trim material, etc.

A primary object of the invention, therefore, is to provide various forms of clip fasteners in which the attaching means is provided in conjunction with an imperforate button-like head that completely covers and closes the attaching opening and thereby prevents the passage of water, dust and other foreign matter through any such opening.

A further object of the invention is to provide various forms of clip fasteners having such imperforate button-type heads by which the attaching opening is rendered impervious to the passage of water, dust and other foreign matter, and in which the attaching means is so designed as to be easily and quickly slid into final position in interlocked engagement in aligned openings in the parts secured.

Another object of the invention is for the provision of various improved fasteners comprising imperforate button-like heads adapted for leak-proof and dust-proof attachment over an attaching opening in parts to be secured and attaching means in the form of a hook or the like which is easily and quickly secured in such opening together with a cooperating locking shoulder which locks the fastener in attached position against loosening or removal.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a perspective view of one form of fastener in accordance with the invention as seen from the underside thereof;

Fig. 2 is a sectional view illustrating the fastener of Fig. 1 as applied in an opening provided by aligned holes in a pair of superposed parts to secure the same together;

Fig. 3 is a perspective view showing the fastener of Figs. 1 and 2 as applied in a typical assembly for attaching a rubber sealing strip to a panel in an automobile installation, for example; and, Fig. 4 is a sectional view on an enlarged scale of the assembly of Fig. 3 showing the disposition of the fastener for securing the retainer portion of the sealing strip to the supporting panel in the completed mounting of the rubber sealing strip.

Fig. 5 is a perspective view of another form of fastener as seen from the underside thereof;

Fig. 6 is a perspective view of the top of the fastener of Fig. 5 showing the imperforate button-like head thereof; and, Fig. 7 is a sectional view showing the fastener of Figs. 5 and 6 as applied to an opening formed by aligned holes in a pair of superposed parts to be secured.

Fig. 8 is a sectional view showing a further form of fastener as applied to aligned holes in two or more parts to secure the same together;

Fig. 9 is a bottom plan view of the fastener shown in Fig. 8; and,

Fig. 10 is an edge elevational view of the fastener shown in Figs. 8 and 9.

Fig. 11 is a sectional view of an assembly in which another form of the fastener is shown applied in aligned holes in a pair of superposed parts to secure the same together; and, Fig. 12 is a bottom plan view of the fastener seen in Fig. 11.

Fig. 13 is a sectional view of an assembly in which a further form of fastener in accordance with the invention is shown applied to aligned holes in superposed parts to secure the same together; and, Fig. 14 is a bottom plan view of the fastener shown in Fig. 13.

The improved fastening devices of the invention are of general utility and may be readily provided in any size or form necessary for use in various installations in proportion to the size and contour of the parts secured. The fastening devices are particularly suited for use in securing a part to an apertured supporting part by a simple and quick operation taking place entirely from one side thereof as required in a blind location, for example. In any form, the fastener comprises an imperforate button-like head which completely covers aligned openings in the parts secured and attaching means in the form of a hook, or the like, which is applied easily and quickly through said openings to secure said parts by a clasping action together with a locking shoulder or the like which locks the fastener in applied fastening position against loosening or displacement. The imperforate, button-like head of the fastener not only serves to close the aligned openings in the parts secured against the passage of moisture, dust and other foreign matter but also presents a smooth rounded surface which provides for safety and a neat and pleasing appearance.

Referring now, more particularly, to the drawings, Figs. 1–4 inclusive show one form of fastener in accordance with the invention and a typical application thereof as employed for securing a rubber sealing strip onto a support such as a panel in an automobile installation, for example. The support may be of any suitable material such as sheet metal, wood, fiber board, or the like, and in the present illustration is shown comprising a metallic plate or panel portion 1 defined by an inturned flange or the like on an overlying main body panel A as seen in Fig. 3. The main body panel A accordingly renders the inner side of said plate portion 1 inaccessible for holding a nut to receive a bolt or screw for securing the sealing strip B to said plate portion. The fastener of the present invention, however, is admirably suited for this purpose inasmuch as it may be applied to fastening position by an operation taking place entirely from the accessible side of the assembly. The supporting panel or plate portion 1 is provided with suitable stud openings or holes 2 along the path which the rubber sealing strip B is secured thereto in mounted position. The rubber sealing strip B is of the type which is molded onto a metallic rib 5 carried by a flange 6 in the form of a plate-like retainer strip which is provided with spaced openings 7 corresponding substantially to the spacing of the openings 2 in the supporting panel 1. The aligned openings 2 and 7 in the parts to be secured may be of any desired configuration such as circular holes or elongate slots and need not be of the same size or design so long as they may be suitably aligned, substantially as illustrated in Figs. 2 and 4.

The fastener, designated generally 10, is formed from a relatively small inexpensive blank of sheet metal which is readily severed from standard sheet metal strip stock with very little loss or waste of material. The fastener may be made of any suitable sheet metal but preferably that of a spring metal nature such as spring steel or cold rolled metal having spring characteristics and otherwise of a much greater tensile and compressive strength than the plate portions 1, 6, secured thereby. The fastener is provided with a base or body 11 of any desired shape or design in the form of an imperforate button-like head. Preferably the fastener body 11 is formed in the stamping operation in a generally concave, dished formation together with an integral arm 13 at one end which is return bent to lie under said base or body 11 and substantially within the concave interior thereof in normal untensioned relation. The spring arm 13 is provided with a resilient hook 14, tongue, or the like, which is stamped from the material of said arm to extend in the opposite direction in generally parallel and spaced relation thereto. The resilient hook 14 defines a shoulder 15 adjoining said spring arm 13 and a clasping portion spaced therefrom in normal untensioned relation a distance approximating the combined thickness of the parts 1, 6, to be secured. Preferably the extremity or free end of said hook 14 terminates in an outwardly flared lip element 16 which facilitates the initial application of the hook over the marginal edge of the opening 2 of part 1 at the underside of the assembly. The free end of the spring arm 13 is suitably formed, as by a slight outward bend, to define a sharp locking shoulder 18 on the extremity of said spring arm 13 which is spaced from the shoulder 15 on the hook a distance approximating the predetermined distance between opposing wall portions of the aligned openings 2, 7 in the parts to be secured.

With the fastener 10 thus provided and the parts 1, 6, to be secured prepared with the openings 2, 7, respectively, in suitable registration as shown in Figs. 2 and 4, the fastener is easily and quickly applied to locked fastening position securing said parts by an operation taking place entirely from the outer, readily accessible side of the assembly. This is effected simply by inserting the free end of the resilient hook 14 into and through the aligned panel openings 2, 7, and sliding the fastener in the direction of the free end of said hook 14. The outwardly flared lip 16 on the extremity of said hook 14 facilitates this initial step in applying the hook by causing a gradual outward flexing thereof relatively to the associated spring arm 13 as it cams over the edge of the opening 2 at the underside of the assembly. By pressing on the base or body 11 of the fastener and simultaneously sliding the fastener forward the clasping tongue portion of said hook 14 clears the underside of the supporting part 1 and permits the fastener to be advanced to its fully applied fastening position to the point at which the shoulder 15 on said hook abuts the adjacent wall portion or marginal portion of the opening 2 in the supporting part 1 at the edge of said opening as illustrated in Fig. 2. In this position, the pronounced locking shoulder 18 defined by the free end of the spring arm 13 snaps into the opening 7 of the retainer strip 6 in engagement with the adjacent wall thereof in directly opposed relation to the shoulder 15, inasmuch as it is provided in a predetermined spacing from said shoulder 15 for this purpose in order to cooperate therewith and lock the fastener in fully applied fastening position. Said locking shoulder 18, accordingly, cooperates with the shoulder 15 on the hook in engaging opposing wall portions of the aligned openings 2, 7, to prevent endwise displacement or shifting of the fastener from final position. In this relation, the hook 14 is in rigid, clasping engagement with the underside of part 1 and cooperates with the spring arm 13 and fastener body 11 to fasten the secured parts 1, 6, under continuously effective spring tension. In the application of the fastener, the fastener body or base 11 flexes and yields as necessary to permit the hook 14 to be advanced to final position in which said fastener body or base 11 is disposed in close, substantially flush relation to the outer surface of the secured part 6. The arrangement is such that the smooth rounded formation of the fastener body or base 11 defines a blunt, button-like protuberance on the exposed surface of the assembly for safety purposes and presents a neat and pleasing appearance while otherwise covering and closing the aligned openings 2, 7, against the passage of moisture, dust and other foreign matter as adequately as necessary for most purposes.

In the event that it is necessary or desirable to remove the fastener from attached fastening position, a suitable tool is employed to wedge the fastener body or base 11 from the adjacent surfaces of part 5 as necessary to displace the locking shoulder 18 on the extremity of the spring arm 13 from abutting relation with the engaged wall portion of the opening 7, whereupon the fastener may be slid reversely to disengage the attaching hook 14 from fastening position and thereby permit the fastener to be removed.

Figs. 5–7 inclusive disclose another form of the invention in which the fastener 20 comprises a similar imperforate button-like body or base 21 having an integral strip at one end which is return bent to provide a spring arm portion 22 under the fastener base and within the concave interior thereof together with an outwardly bent portion providing the attaching hook or tongue 24. The hook 24 as thus provided includes a shoulder 25 adjoining the spring arm portion 22 and terminates in an outwardly flared lip 26 which preferably extends slightly beyond the periphery of the fastener body or base 21.

At a suitable space from the shoulder 25 on the hook, an imperforate depression is formed in the fastener body 21 to provide a pronounced locking shoulder 28 spaced from said shoulder 25 a distance substantially equal to or slightly less than the space between opposing wall portions of the aligned holes in the parts to be secured. As shown in Fig. 7, the fastener is adapted to secure any two or more parts C, D, in an assembly similar to that of Figs. 1–4 inclusive by application to any suitable opening in such parts provided, for example, by aligned circular holes 3, 4. In this regard, the locking shoulder 28 is provided in a rounded formation corresponding to the contour of the circular opening thus provided so as to be received therein in snug engagement with the adjacent wall thereof. The fastener 20, accordingly, comprises a construction which is more or less equivalent to that of Figs. 1–4 inclusive and is adapted to be applied in a similar manner to serve the same purpose and use, substantially as described. A divisional application Serial Number 203,181, filed December 28, 1950, is directed to the fastening device shown in Figs. 5–7, inclusive.

Figs. 8–10 inclusive show a further form of the invention comprising the fastener 30 which is similar to that just described in that the imperforate button-like body or base 31 is provided with an integral strip portion which is return bent into a spring arm portion 32 and further bent to provide the attaching hook or tongue 34 defining the shoulder 35 and outwardly flared lip 36 on the extremity thereof.

An opposite integral strip portion 37 is bent inwardly under the concave fastener body 31 and has the end portion thereof bent into a locking shoulder 38 which is spaced from the shoulder 35 on the hook a distance approximating the predetermined space between opposing wall portions of the opening in the secured parts C, D. Preferably the fastener base 31 is provided with inturned flange portions 33 on its periphery except in the regions in which the integral strips 32 and 37 extend from said fastener base. Such flanges 33 rigidify the fastener body 31 and provide a smooth peripheral edge thereon which is substantially in the plane of the integral strips 32, 37, to provide an even uniform seating of the fastener on the adjacent surface of the part C secured as seen in Fig. 8.

Figs. 11 and 12 illustrate another form of fastener 40 comprising a generally concave, dished body or base 41 and an integral strip or spring arm 42 at one side thereof which extends entirely across the underside of the fastener body. The free end of said arm or strip 42 is crimped under an inturned flange 43 which also provides the fastener with a smooth peripheral edge that is adapted for even uniform seating of the surface of the adjacent part secured as shown in Fig. 11.

A hook or tongue 44 is stamped from the material of said arm 42 and includes a shoulder 45 and an outwardly flared lip 46 on the extremity thereof. At a suitable predetermined spacing from the hook 44, a tab is pressed from said arm 42 so that its extremity defines a locking shoulder 48 spaced from said shoulder 45 on the hook a distance substantially equal to or slightly less than the space between opposing wall portions of the opening defined by the aligned holes 3, 4, in the secured parts C, D.

Figs. 13 and 14 disclose a similar fastener 50 comprising a generally concave base or body 51 and a separate arm or strip 52 which is provided with a hook 44 and cooperating locking shoulder element 48 struck and formed therefrom in the same general construction of the fastener of Figs. 11 and 12. The ends of the arm or strip 52 are retained within the generally concave base 51 by an inturned peripheral flange 53 which rigidifies the fastener body and provides a smooth, uninterrupted annular surface by which the fastener is adapted to seat evenly and uniformly on the surface of the adjacent part secured as illustrated in Fig. 13.

It will be understood that each form of fastener shown in Figs. 8–10 inclusive, Figs. 11 and 12, and Figs. 13 and 14, comprises in its construction an attaching hook and a cooperating locking shoulder in the same general relation and for the same purpose as in the previously disclosed forms of the invention, and accordingly, each of these fasteners is adapted to be applied and used, likewise, in the manner described in detail with reference to Figs. 1–4 inclusive and Figs. 7 and 8.

While the invention has been described in detail with specific examples, such examples are intended as illustrations only inasmuch as it will be apparent that other modifications in the construction, arrangement and general combination of parts may be devised without departing from the spirit and scope of the invention.

What is claimed is:

1. A fastener comprising a sheet metal body providing an imperforate base, an arm integrally connected to the peripheral edge of said imperforate base and extending under said imperforate base, a hook carried by said arm extending reversely in the opposite direction from said arm, said hook projecting outwardly out of the plane of said arm in position to be received in a work opening in clasping relation with the work adjacent said opening in the attached position of the fastener, and a locking shoulder provided at the free end of said arm and also receivable in said work opening to retain said hook in the work opening in said attached position of the fastener.

2. A fastener comprising a sheet metal body providing an imperforate base, an arm integrally connected to the peripheral edge of said imperforate base and extending under said imperforate base, a hook pressed out of the material of said arm and extending reversely in the opposite direction from said arm, said hook projecting outwardly out of the plane of said arm in position to be received in a work opening in clasping relation with the work adjacent said opening in the attached position of the fastener, and a locking shoulder provided at the free end of said arm and also receivable in said work opening to retain said hook in the work opening in said attached position of the fastener.

GEORGE A. TINNERMAN.

REFERENCES CITED

The following references are of record in the file of this patent:

UNITED STATES PATENTS

| Number | Name | Date |
|---|---|---|
| 1,538,320 | Gullong | May 19, 1925 |
| 2,041,335 | Hall | May 19, 1936 |
| 2,080,769 | Fitts | May 18, 1937 |
| 2,083,056 | Cox | June 8, 1937 |
| 2,133,837 | Wiley | Oct. 18, 1938 |
| 2,144,882 | Johnson | Jan. 24, 1939 |
| 2,150,497 | Fernberg | Mar. 14, 1939 |
| 2,168,721 | Tinnerman | Aug. 8, 1939 |
| 2,200,047 | Tinnerman | May 7, 1940 |
| 2,222,449 | Tinnerman | Nov. 19, 1940 |
| 2,257,855 | Place | Oct. 7, 1941 |
| 2,511,805 | Kral | June 13, 1950 |